Feb. 14, 1956

J. J. ROSE ET AL 2,734,477

CRANKSHAFT POSITION INDICATOR

Filed Dec. 23, 1953

INVENTORS.
JOHN J. ROSE
MELVIN F. KOLLMANN
BY
AND
ATTORNEYS

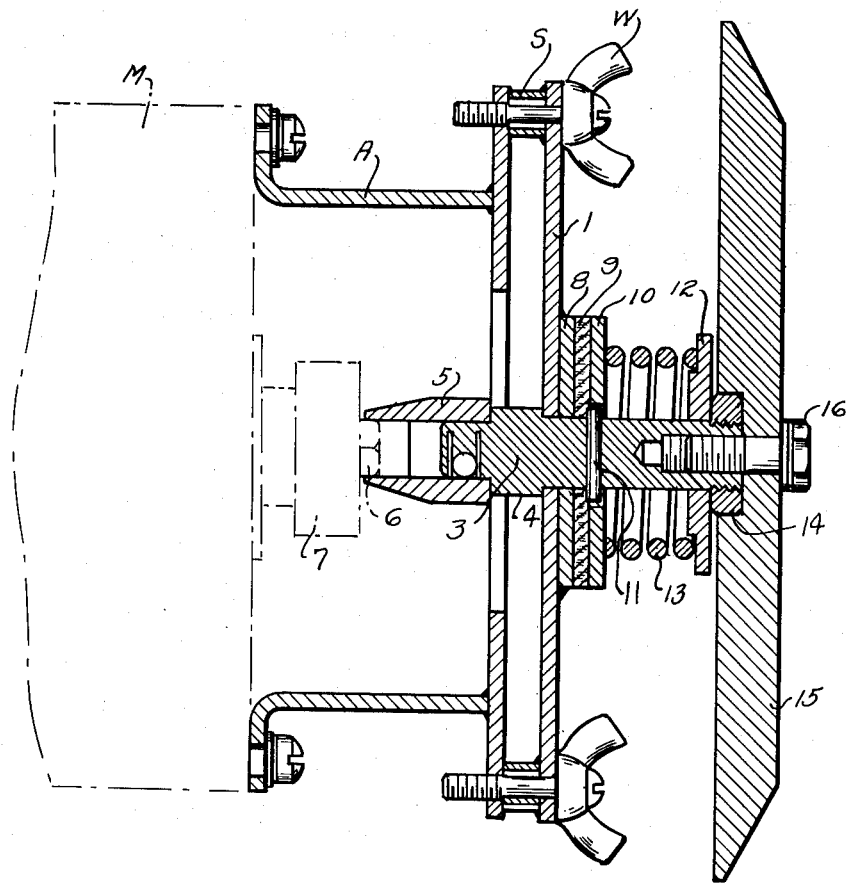

United States Patent Office 2,734,477
Patented Feb. 14, 1956

2,734,477

CRANKSHAFT POSITION INDICATOR

John J. Rose and Melvin F. Kollmann, Dayton, Ohio

Application December 23, 1953, Serial No. 400,154

4 Claims. (Cl. 116—124)

(Granted under Title 35, U. S. Code (1952), sec. 266)

This invention may be manufactured and used by or for the Government for governmental purposes without the payment to us of any royalty thereon.

This invention relates to a device and system for accurately indicating crankshaft position in internal combustion engines, particularly where direct access to the engine crankshaft is impossible, whereby highly accurate timing of an engine is made possible.

The main problem presented in accurately indicating engine crankshaft positions from an auxiliary drive such as a magneto drive, particularly through reduction gears, is one of backlash and the subject invention eliminates this difficulty by preloading the drive with a clutch brake having a predetermined loading which brake is used in conjunction with a protractor disc associated therewith for referencing the position of the crankshaft at all times.

The particular practical embodiment of the invention described herein is shown as applied to a magneto drive and more particularly for purposes of illustration to an R4360 aircraft engine where the need for the invention is particularly evident. Since there are a multiplicity of magnetos as well as engine cylinders in the particular engine which is to be timed in the illustrative application, while the complete indicator unit is to be applied to a single magneto drive, in this engine each of the other magnetos must be provided with the preloading brake unit of the subject invention to prevent backlash in the drive gearing. Other types of engines may or may not require this additional preloading dependent on the engine construction.

The novel timing apparatus of the subject invention provides for an elimination of backlash errors in the indirect transmission of engine crankshaft positions and enables consistently accurate timing of engines in assembly or inspection periods. The apparatus enables correct valve adjustment and accurate breaker point adjustment for accurately timed sequential operation thereof relative to the actuation of the respectively associated pistons in their cylinders as they are controlled by the engine crankshaft. This is due to the improved direct accurate indication of crankshaft position resulting from the subject invention apparatus.

An object of this invention is to provide an improved engine timing apparatus.

Another object of this invention is to provide a highly accurate crankshaft position indicator where direct access to the crankshaft is impossible.

A further object of this invention is to provide a novel crankshaft position indicator device which may be applied to an auxiliary drive mechanism.

An additional object of the invention is to provide an improved timing apparatus including a novel accurate crankshaft position indicator which may be applied to the magneto of an engine including a backlash eliminating device whereby a highly accurate indication of crankshaft position may obtain.

Other objects and advantages of this invention will become readily apparent to those versed in the art from the following description thereof taken in conjunction with the accompanying drawings wherein like numerals indicate like elements and wherein:

Fig. 2 is a cross-sction of the novel indicating assembly shown in Fig. 1 as applied to a magneto drive of another type of magneto with a modified adapter.

The novel improved timing unit of the subject invention employs a suitable adapter for mounting on the housing of the auxiliary drive employed which is a magneto drive in the practical embodiment of the invention as shown and described herein. The timing unit includes a drive shaft having a coupling means on one end thereof for positive connection to the magneto drive and an adjustable slipping clutch type brake means mounted on the drive shaft for operative association therewith to preload the magneto drive. A timing disc is mounted on the outer end of the drive shaft in secured relation thereto for accurate indication of engine crankshaft position and a reference pointer is associated therewith in fixed relation thereto to identify the degree of rotation of the crankshaft of an engine as transmitted through the auxiliary drive.

Figure 1:
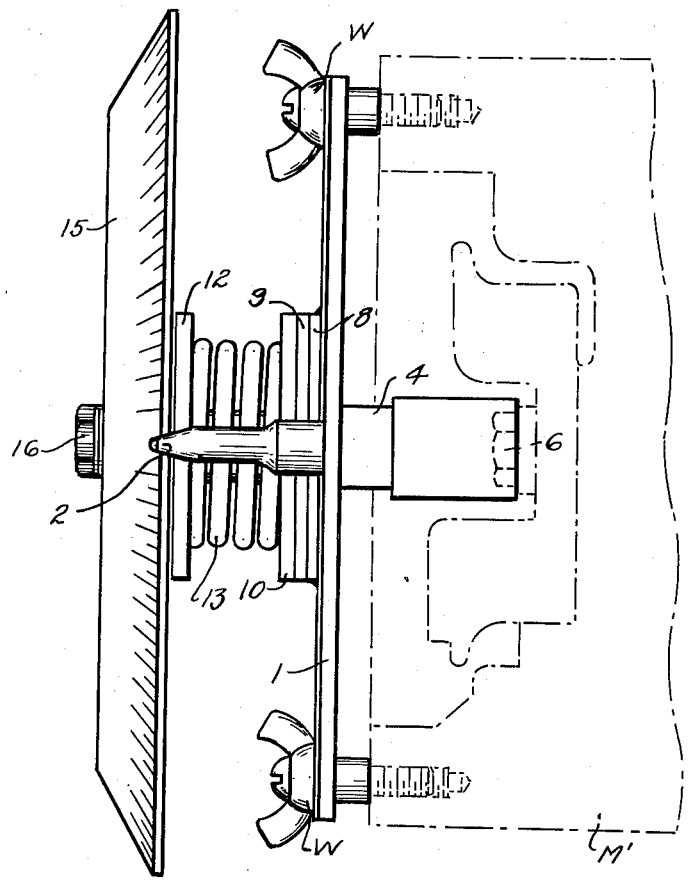
Fig. 1 is a side view of the novel indicator assembly as applied to a magneto of an engine.

As shown in the Fig. 2 of the drawings which shows the invention with a type of magneto M the cover plate of the magneto is removed and replaced by a centrally apertured support member of adapter A. To the outer face of the adapter A and spaced therefrom by spacers S is bolted a centrally apertured adapter plate 1 by wing bolts W extending through the spacers to engage the adapter A to cooperate therewith to form a support means. Fixed to the plate 1 at 90° displacement from the wing bolts is a fixed pointer 2 as shown in Fig. 1 of the drawings. A central shaft 3 having a flange portion 4 abutting the adapter plate at its inner face is journalled in the aperture of the adapter plate 1 and has a socket member 5 secured to the inner end thereof for engagement with a nut 6 on the outer end of the magneto drive shaft 7 to form a transmitting means. Concentric with shaft 3 are three superimposed braking discs, a steel disc 8 welded to the outer face of the plate, a cork disc 9 free and abutting the steel disc 8 and another steel disc 10 keyed to the central shaft 3 by a pin 11 and abutting the cork disc 9. Spaced from the disc 10 and concentric with the shaft 3 is an abutment disc 12. A coil biasing spring 13 is interposed between the respective discs 10 and 12. The spring is selected to enable a predetermined braking torque. The outer end of the shaft 3 is threaded internally and externally. A nut 14 adjustably mounted on the outer end of the shaft 3 in threaded engagement therewith externally abuts the outer disc 12 to apply a predetermined compression load through the spring 13 to the disc 10 and associated discs to provide a drag or friction braking means on the magneto drive. A reference plate 15 having the perimeter thereof calibrated to indicate 720° is fixed to the central shaft 3 by a bolt member 16 and serves as a timing disc. Thus the timing disc is directly connected to the central shaft 3 and to the outer end of the magneto shaft. Moreover the cork disc 9 floats free between the steel discs 8 and 10 but the coil biasing spring serves to normally clutch the cork disc between the steel discs to apply a predetermined braking torque on the magneto drive to eliminate backlash in the system.

The structure of the novel timing apparatus as shown in Fig. 1 is identical with that shown in Fig. 2 with the exception that the adapter A may be eliminated when the invention apparatus may be directly applied to the magneto housing of the type shown therein.

Figure 3:
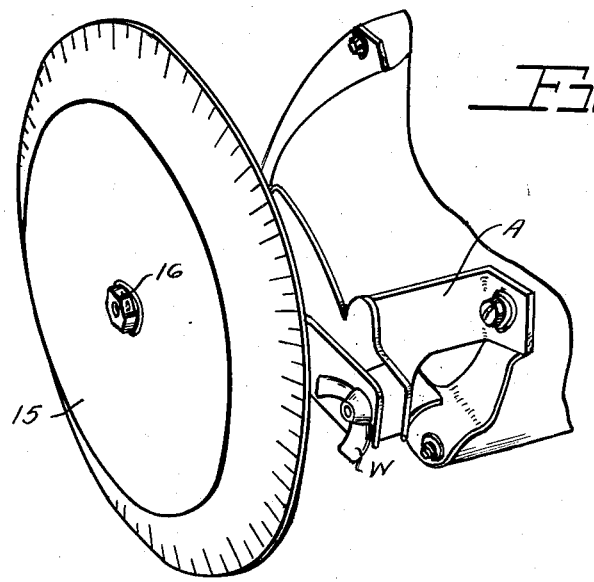
Fig. 3 is a perspective view of a modified application of the invention apparatus to a magneto necessitating a further adapter modification.

Fig. 3 of the drawings shows further how the adapter A may be modified to take the form of a bridge element depending on the housing structure of the auxiliary drive to which the improved timing apparatus is applied. The design of the adapter is an arbitrary one which may be modified or eliminated to meet the desired application and accordingly it appears unnecessary to make any detailed description of the design of the invention shown in Fig. 3, since the invention structure is otherwise identical with that shown in Fig. 2 of the drawings.

In practice, for example the novel timing apparatus is applied to timing an R4360 engine which has several magnetos and twenty eight cylinders arranged in rows. On this engine the magnetos operate at one half engine crankshaft speed. The practical embodiment of the invention apparatus accordingly is provided with a timing device defining 720 equal spaces so that for one revolution of the magneto shaft and timing disc the two revolutions of the crankshaft giving a complete engine cycle are indicated in degrees. In timing, the indication of the zero point of the disc is set to coincide with TDC on the compression stroke of the first cylinder on a prescribed row. Thus the relation of the crankshaft position and the relative movement of the pistons in the respective engine cylinders may be readily determined by indication on the timing disc for setting of valves and breaker points. For any particular degree of crankshaft rotation for example 90° the valves and breaker points are required to be in a particular position relative to the corresponding cylinders. Accordingly as the crankshaft is rotated slowly the valves and breaker points may be set as carefully as possible with reference to standard charts applicable to the particular engine being timed in a manner well known in the art.

The spring on the shaft 3 is selected to give a braking torque on the shaft through the disc assembly of approximately 40 inch pounds. This results in a continuous drag braking means on the magneto which eliminates the backlash in the magneto driving gears so that precise translation of position between the crankshaft and timing disc obtains. This braking torque unit serves both to hold 40 inch pounds torque against the drive and to hold the magneto in position to make the timing corrections.

It is noted that the calibration of the timing disc herein is to conform to the relation of the speed of the auxiliary drive to that of the engine crankshaft. Accordingly the calibration can be varied to meet the conditions of the application.

The subject invention fills a need long absent in timing devices for engines and in its very simplicity produces a device both capable of ready production and a saving in time and money by its accuracy in application.

While a particular application and practical embodiment of the invention has been disclosed herein, many variations and applications thereof will be readily apparent to those versed in the art and such lies within the scope of the invention and the invention is intended to be limited only as defined by the claims.

What is claimed is:

1. Engine timing apparatus for timing an engine through a magneto including a shaft where direct access to a crankshaft is not possible comprising support means constituting a magneto cover plate for mounting on the magneto a shaft journalled in said support means having coupling means at one end thereof for engagement with the magneto shaft, a timing disc fixed to the other end of the shaft, a reference pointer connected to the support means and fixed relative to the timing disc, a clutch element fixed to the support means, a second clutch element fixed to the shaft, a resilient clutching element free between the first and second clutching means, and means mounted on said shaft and associated with said clutch elements for applying a predetermined braking load to the shaft to eliminate backlash effects whereby a highly accurate timing of the engine may obtain.

2. Engine timing apparatus for timing an engine through a magneto including a shaft where direct access to the crankshaft is not possible comprising support means constituting a magneto cover plate for mounting on the magneto, transmitting means journalled in said support means having coupling means on one end thereof for driven engagement with the magneto shaft, a timing disc fixed to the transmitting means at the other end thereof, a reference pointer fixed on said support means relative to the timing disc, and adjustable friction brake means continuously interconnecting the transmitting means and the support means in biased relation thereto eliminating backlash effects whereby a highly accurate indication of engine crankshaft movement will be readily transmitted to the timing disc.

3. Engine timing apparatus for timing an engine through an auxiliary drive where direct access to the crankshaft is not possible comprising support means for fixed mounting relative to the auxiliary drive, shaft means journalled in said support means for rotation relative thereto having coupling means at one end thereof for driving engagement with the auxiliary drive, a first clutch means fixed to the support means, a second clutch means fixed to said shaft, a third clutch means mounted free on said shaft intermediate said first and second clutch means, means on said shaft associated with said clutch means operable to apply a predetermined load to said shaft to eliminate backlash, a timing disc fixed to said shaft, and a pointer fixed to said support means whereby on rotation of the crankshaft the position thereof at any point of its cycle may be readily and accurately determined.

4. Engine timing apparatus for timing an engine by engagement with a magneto drive including a shaft where direct access to the crankshaft is not possible comprising support means constituting a magneto cover plate for mounting on the magneto drive, a shaft journaled in said support means having means at one end for positive engagement with the magneto shaft, a timing disc secured to the other end of the shaft for rotation therewith, a reference pointer mounted on the support means in fixed relation to the timing disc, a clutch ring of metal secured to the support means, a metal clutch ring secured to the shaft, a resilient ring interposed between said metal rings and means adjustably connected to the shaft and biasing the rings into frictional engagement with each other to apply a predetermined load to the shaft eliminating backlash in transmission of crankshaft rotation to the timing disc whereby a positive accurate timing of the engine may obtain.

References Cited in the file of this patent

UNITED STATES PATENTS

| | | |
|---|---|---|
| 2,218,048 | Meyers | Oct. 15, 1940 |
| 2,437,283 | Viers | Mar. 9, 1948 |
| 2,443,135 | Glotfelty | June 8, 1948 |